(12) United States Patent
Breau et al.

(10) Patent No.: US 7,924,738 B1
(45) Date of Patent: Apr. 12, 2011

(54) SELECTING A DIFFERENTIAL TREATMENT FIELD VALUE

(75) Inventors: Jeremy R. Breau, Kansas City, MO (US); Frederick C. Rogers, Olathe, KS (US); Gary Joel Rieschick, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 327 days.

(21) Appl. No.: 12/131,560

(22) Filed: Jun. 2, 2008

(51) Int. Cl.
H04L 12/26 (2006.01)
(52) U.S. Cl. .................................................. 370/253
(58) Field of Classification Search .................. 370/253, 370/252, 229, 230, 389
See application file for complete search history.

(56) References Cited

U.S. PATENT DOCUMENTS

| | | | |
|---|---|---|---|
| 2003/0086425 A1 | 5/2003 | Bearden et al. | |
| 2003/0108045 A1* | 6/2003 | Jayam et al. | 370/394 |
| 2003/0152028 A1 | 8/2003 | Raisanen et al. | |
| 2009/0092047 A1* | 4/2009 | Gemelos et al. | 370/235 |

OTHER PUBLICATIONS

Anritsu Corporation, "MD1231A IP Network Analyzer," Apr. 2003, pp. 1-16, Anritsu Corporation, Tokyo, Japan.
Angus Ma, "Multi-Protocol Label Switching (MPLS) and Core Router Testing," Spirent Communications White Paper, Mar. 2003, 38 pages, Spirent Communications, Inc., Calabasas Hills, California.
Scott Poretsky, "Methodology for Benchmarking Network-layer Traffic Control Mechanisms," Network Working Group, Mar. 2006, pp. 1-10, Internet Draft, Reef Point Systems, Burlington, Massachusetts.
Scott Poretsky, et al., "Methodology for Benchmarking Network-layer Traffic Control Mechanisms," Network Working Group, Jun. 2006, pp. 1-13, Internet Draft, Reef Point Systems, Burlington, Massachusetts, Cisco Systems, United Kingdom.
Cisco Systems, Inc., "Implementing Quality of Service Policies with DSCP," Document ID: 10103, May 24, 2006, 7 pages, Cisco Systems, Inc.
Kathleen Nichols, et al., "Definition of the Differentiated Services Field (DS Field) in the IPv4 and IPv6 Headers," Network Working Group, Dec. 1998, pp. 1-20, Cisco Systems, San Jose, California, Torrent Networking Technologies, Morrisville, North Carolina, Cisco Systems, Santa Barbara, California, EMC Corporation, Hopkinton, Massachusetts.

(Continued)

*Primary Examiner* — Derrick W Ferris
*Assistant Examiner* — Mang Yeung (57) ABSTRACT

A first block of packets is sent through a network at a first throughput rate. The first block of packets has a differential treatment field set to a first value. A second block of packets is sent through the network at a second throughput rate. The second block of packets has the differential treatment field set to a second value. A first report indicating that the reception of the first block of packets satisfies a criteria is received. A second report indicating that the reception of the second block of packets satisfies the criteria is received. A treatment field value for the differential treatment field is selected based on the first report and the second report. A packet with the differential treatment field set to the treatment field value is sent to the network.

20 Claims, 5 Drawing Sheets

OTHER PUBLICATIONS

Steven Blake, et al., "An Architecture for Differentiated Services," Network Working Group, Dec. 1998, pp. 1-36, Torrent Networking Technologies, Morrisville, North Carolina, EMC Corporation, Hopkinton, Massachusetts, Sun Microsystems, Inc., Boulder, Colorado, Nortel UK, Harlow, Essex, United Kingdom, Bell Labs Lucent Technologies, Holmdel, New Jersey, Lucent Technologies, Concord, Massachusetts. Juha Heinanen, et al., "Assured Forwarding PHB Group," Network Working Group, Jun. 1999, pp. 1-11, Telia Finland, Vantaa, Finland, Cisco Systems, Santa Barbara, California, Lucent Technologies, Concord, Massachusetts, MIT Laboratory for Computer Science, Cambridge, Massachusetts.

Bruce Davie, et al., "An Expedited Forwarding PHB (Per-Hop Behavior)," Network Working Group, Mar. 2002, pp. 1-16, Cisco Systems, Inc., Chelmsford, Massachuusetts, Motorola, Tewksbury, Massachusetts, Tellabs Research Center, Mishawaka, Indiana, ICA-EPFL, INN, Lausanne-EPFL, Switzerland, TRW, Redondo Beach, California, PMC-Sierra Inc., Ottawa, Ontario, Canada, Nortel Networks, Billerica, Massachusetts, Lucent Technologies, Holmel, New Jersey.

* cited by examiner

FIGURE 5 ion a packet is set to the first value based on the first throughput rate and the second throughput rate.

SELECTING A DIFFERENTIAL TREATMENT FIELD VALUE

TECHNICAL BACKGROUND

Modern data networks may carry packets for various types of services. These services include video, voice, web pages, streaming audio, webcasts, shared desktops, web browsing, and email. Each of the services may have different quality of service (QoS) requirements. For example, email generally requires a guarantee that each packet is delivered to the ultimate destination because a lost packet may garble the message. In addition, email does not particularly care how fast the packets are delivered because most email accounts are only checked occasionally. In contrast, a voice service (such as voice over internet protocol—VoIP) can usually tolerate the loss of an occasional packet. A voice service also needs timely delivery of packets or gaps in the conversation will be heard.

To accommodate the different needs of different network carried services, several standards have been drafted. For example, the Internet Engineering Task Force (IETF) has published several documents describing a mechanism for classifying, managing network traffic, and providing quality of service guarantees collectively referred to as DiffServ. DiffServ is further described in RFC-2474, RFC-2475, RFC-2597, and RFC-3246. These documents are available from the IETF at http://www.ietf.org/. Other QoS mechanism have also been proposed by the IETF such as "integrated services" (IntServ). Other entities have also specified QoS mechanisms for networks such as the flow classifications documented in the Institute of Electrical and Electronics Engineers (IEEE) 802.16 (WiMax) standards.

Overview

A method of optimizing data communication is disclosed. A first block of packets is sent through a network at a first throughput rate. The first block of packets has a differential treatment field set to a first value. A second block of packets is sent through the network at a second throughput rate. The second block of packets has the differential treatment field set to a second value. A first report indicating that the reception of the first block of packets satisfies a criteria is received. A second report indicating that the reception of the second block of packets satisfies the criteria is received. A treatment field value for the differential treatment field is selected based on the first report and the second report. A packet with the differential treatment field set to the treatment field value is sent to the network.

A first plurality of blocks is iteratively sent through a network. The first plurality of blocks of packets have a differential treatment field set to a first value. The different iterations of sending the first plurality of blocks of packets are sent at different throughput rates. A first plurality of reports corresponding to each iteration (i.e., each throughput rate) that indicate whether the reception of each of the first plurality of blocks of packets satisfied a criteria is received. A first throughput rate associated with the first value is selected based on the first plurality of reports. A second plurality of blocks is iteratively sent through a network. The second plurality of blocks of packets have a differential treatment field set to a second value. The different iterations of sending the second plurality of blocks of packets are sent at different throughput rates. A second plurality of reports corresponding to each iteration (i.e., each throughput rate) that indicate whether the reception of each of the second plurality of blocks of packets satisfied the criteria is received. A second throughput rate associated with the second value is selected based on the second plurality of reports. The differential treatment field

DETAILED DESCRIPTION

Figure 1:
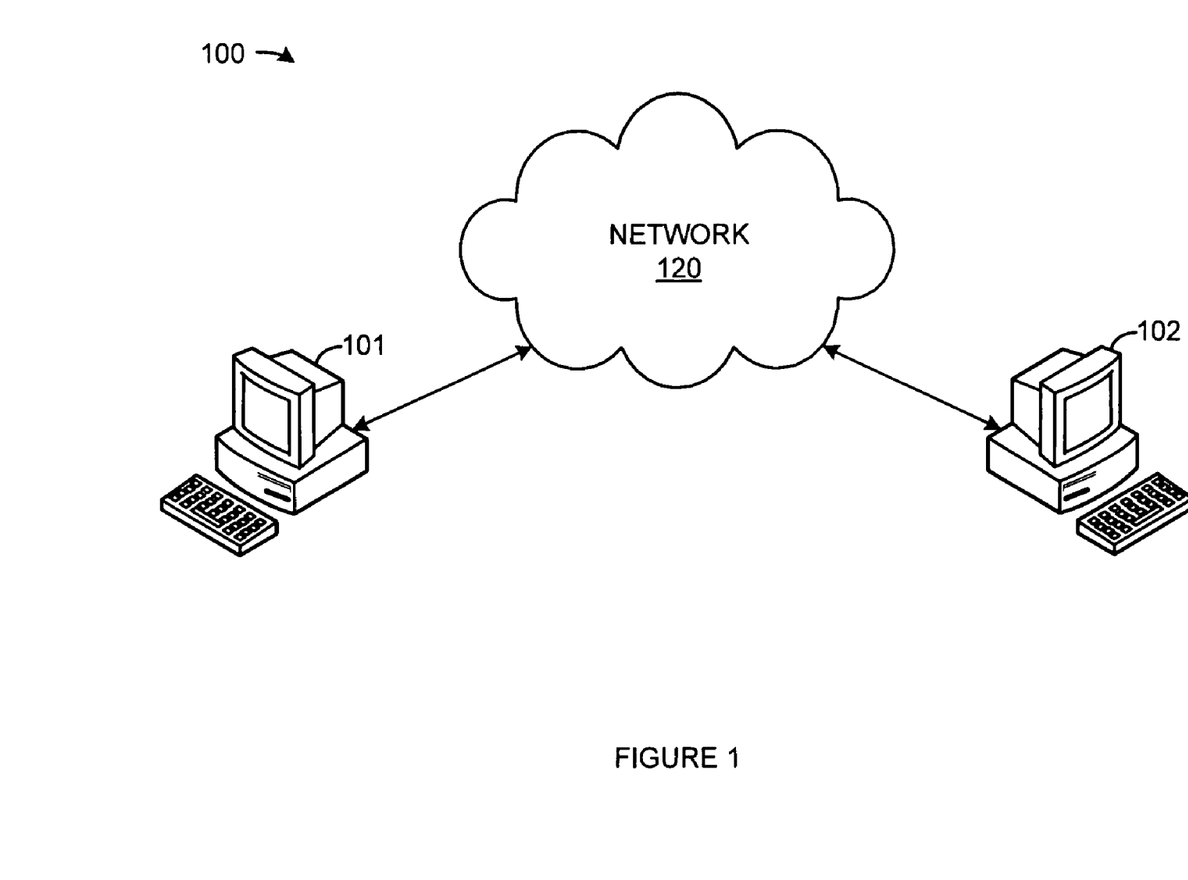
FIG. 1 is a block diagram illustrating a communication system.

FIG. 1 is a block diagram illustrating a communication system. In FIG. 1, communication system 100 comprises computer system 101, computer system 102, and network 120. Computer system 101 is operatively coupled to network 120. Computer system 102 is operatively coupled to network 120. Thus, computer system 101 may be operatively coupled to computer system 102 via network 120.

Network 120 could be any network or collection of networks that couple, link, or otherwise operatively connect computer system 101 with other computer systems, networks, or computer system 102. In addition, other secondary data networks could be used. In an example, communication network 120 may include a backhaul network, a local network, a long distance network, a packet network, or any combination thereof, as well as other types of networks.

In an embodiment, network 120 implements one or more QoS or differential treatment architectures. For example, network 120 may implement the DiffServ architecture to classify incoming packets. These classifications may then be used by network 120 to make per-hop behavior (PHB) decisions about further classification, and traffic conditioning functions. Traffic conditioning functions include metering, marking, shaping, or policing. Thus, incoming packets from computer 101 or computer 102 may be subject to differential treatment by network 120 as they are sent through network 120.

Network 120 may comprise one or more groups of routers (or other network devices) that implement a common set of differential treatment policies. Each of these groups implementing a common set of differential treatment policies are differential treatment domains. In an embodiment, a group of routers that implement a common, administratively defined set of DiffServ policies may be referred to as a DiffServ domain.

Traffic entering or traversing network 120 may be subject to classification and conditioning by one or more differential treatment domains. Traffic may be classified by each differential treatment domain in network 120 by different parameters. For example, a differential treatment domain may classify or mark traffic by source address, destination address, traffic type, or a differential treatment field. Differential treatment domains may elect to ignore or override the classification or differential treatment field value of the sending device or domain. For example, a DiffServ domain may ignore the internet protocol differential services code point (DSCP) field in incoming traffic and assign a new classification based on a different set of classification rules.

Computer system 101 operates to select an optimized value for a differential treatment field that may be used to send communications through network 120. For example, computer system 101 may operate to select a value for a differentiated services field in an internet protocol packet that optimizes communication to or through network 120. In an embodiment, computer system 101 operates to select a value for the internet protocol differentiated services code point field.

To select a value for a differential treatment field, computer system 101 sets the differential treatment field in a block of packets to a first value. Computer system 101 then sends this block of packets to computer system 102 via network 120 at a first throughput (e.g., Kbits/s) rate. Computer system 101 then sends this block of packets to computer system 102 via network 120 at successively increasing throughput rates.

Computer system 102 sends reports on the received blocks of packets back to computer system 101. For example, computer system 102 may report the received throughput rate of the blocks of packets. In another example, computer system 102 may report an indication of whether, or how many, packets were lost.

These reports may be processed by either computer 101 or computer 102 to determine if the reception of these blocks of packets satisfies one or more criteria. For example, computer 101 may process a report from computer 102 to determine if more than a specified percent (e.g., 1% or 10%) of a block of packets sent at a particular throughput rate and differential treatment field value were lost.

Computer system 101 may then generate new blocks of packets with different (e.g., second, third, etc.) differential treatment field values. Computer system 101 may then send these blocks of packets to computer system 102 via network 120 at successively increasing throughput rates. Computer system 101 may then receive reports from computer system 102 about the received blocks of packets. Thus, for each differential treatment field value, computer system 101 is able to measure a performance parameter. For example, for a given differential treatment field value, computer system 101 may measure the maximum throughput before a threshold amount of packet loss occurs.

The measured performance parameters for each differential treatment field value may be compared by computer system 101 to select a differential treatment field value. For example, if a first differential treatment field value provides better throughput than a second, then the first differential treatment field value may be selected.

In another example, a service level agreement (SLA) with the operator of network 120 may provide for differing charges depending on the value of the differential treatment field. Thus, if a first differential treatment field value provides approximately the same performance as a second, then the least expensive of the two differential treatment field values may be selected.

Computer system 101 may then use the selected differential treatment field value to send one of more packets to network 120. These packets may be destined for computer system 102, an internal component of network 120, or another system or network external to network 120.

Figure 2:
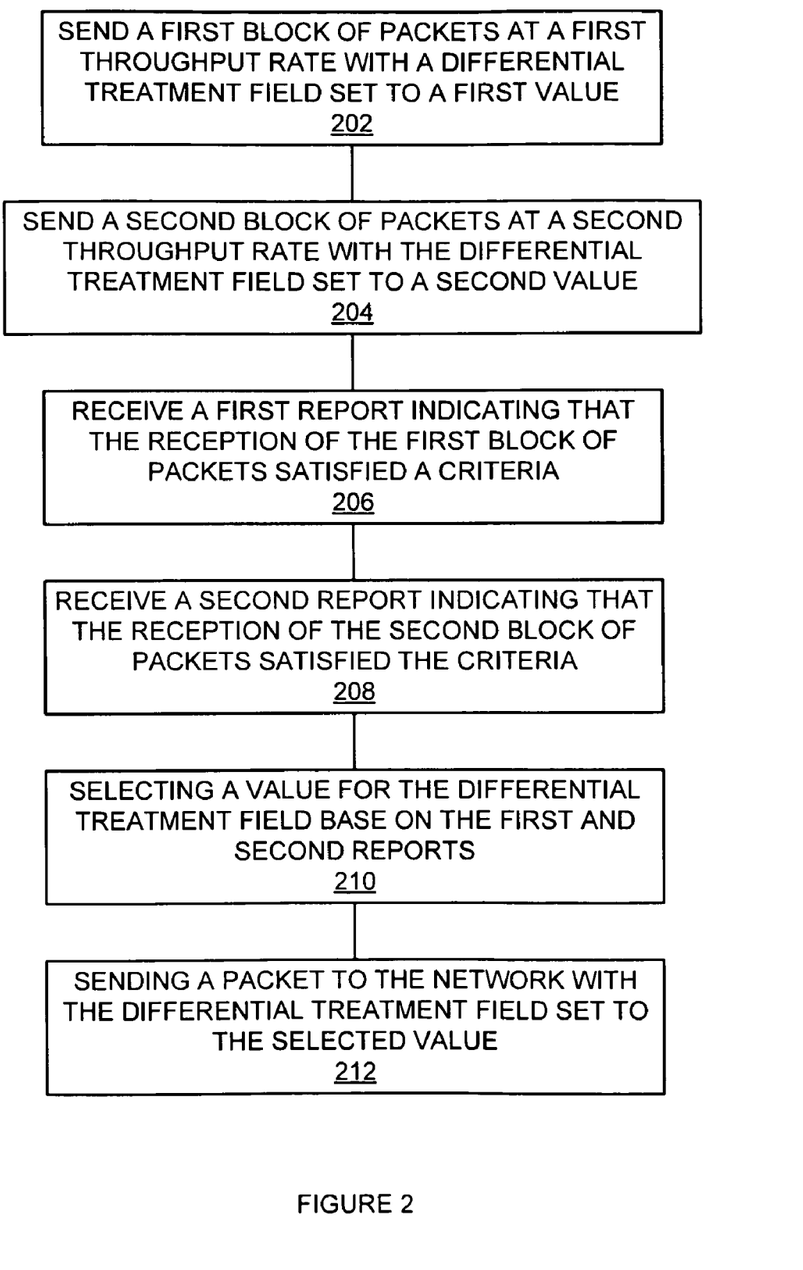
FIG. 2 is a flowchart illustrating a method of optimizing communication.

FIG. 2 is a flowchart illustrating a method of optimizing communication. The method illustrated in FIG. 2 may be performed by one or more elements communication system 100.

A first block of packets is sent at a first throughput rate and with a differential treatment field set to a first value (202). For example, computer 101 may send a first block of packets to computer 102 at a first throughput rate (e.g., 100 KB/s) with a differential treatment field set to a first value (e.g., DSCP=000000).

A second block of packets is sent at a second throughput rate and with a differential treatment field set to a second value (204). For example, computer 101 may send a second block of packets to computer 102 at a second throughput rate (e.g., 110 KB/s) with a differential treatment field set to a second value (e.g., DSCP=111111).

A first report indicating that the reception of the first block of packets satisfied a criteria is received (206). For example, computer system 101 may receive a report from computer system 102 indicating that 1% of the first block of packets were lost. Consider a case where the criteria specifies a threshold level of packet lost must be less than 5%. In this case, the report from computer system 102 that 1% of the first block of packets were lost indicates that the criteria was satisfied.

A second report indicating that the reception of the first block of packets satisfied a criteria is received (208). For example, computer system 101 may receive a report from computer system 102 indicating that 3% of the second block of packets were lost. Also in this case, the report from computer system 102 that 3% of the second block of packets were lost indicates that the criteria was satisfied.

A value for the differential treatment field is selected based on the first and second reports (210). For example, computer system 101 may select the first value for the differential treatment field because the first report indicated a lower packet loss than the second report (e.g., 1% compared to 3%). In an embodiment, the differential treatment field value may be selected based on the throughput associated with the first and second reports. For example, since both the first report and the second report indicated a packet loss rate that satisfied the criteria, computer system 101 may select the second value because the second report was associated with a higher throughput rate than the first report.

A packet is sent to the network with the differential treatment field set to the selected value (212). For example, computer system 101 may send a packet to network 120 with the differential treatment field set to the selected value. This packet may be destined for computer system 102, an internal component of network 120, or another system or network external to network 120.

Figure 3:
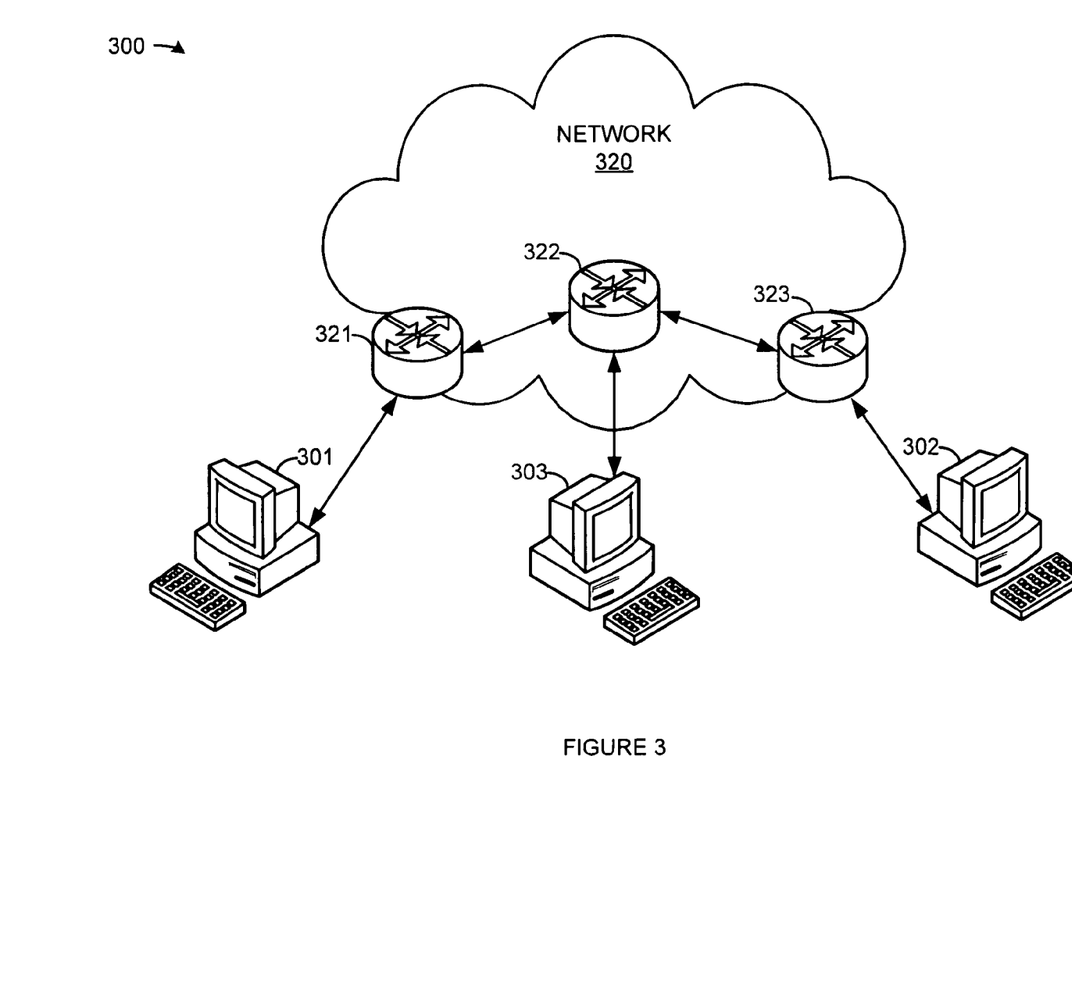
FIG. 3 is a block diagram illustrating a communication system.

FIG. 3 is a block diagram illustrating a communication system. In FIG. 3, communication system 300 comprises computer system 301, computer system 302, computer system 303, and network 320. Network 320 includes router 321, router 322, and router 323. Computer system 301 is operatively coupled to router 321 and thus network 320. Computer system 302 is operatively coupled to router 323 and thus network 320.

Router 321 is operatively coupled to router 322. Router 322 is operatively coupled to router 323. Router 322 is operatively coupled to computer system 303. Therefore, computer system 301 may be operatively coupled to computer system 302 via router 321, router 322, and router 323 of network 320. Also, computer system 301 may be operatively coupled to computer system 303 via router 321, and router 322 of network 320.

Network 320 could be any network or collection of networks that couple, link, or otherwise operatively connect computer system 301 with other computer systems, networks, or computer system 302. In addition, other secondary data networks could be used. In an example, communication network 320 may include a backhaul network, a local network, a long distance network, or a packet network, or any combination thereof, as well as other types of networks.

Network 320 may use the internet protocol DiffServ field to determine how it will treat incoming packet from computer 301. DiffServ is further described in RFC-2474, RFC-2475, RFC-2597, and RFC-3246. These documents are available from the IETF at http://www.ietf.org/ and are hereby incorporated herein by reference. Network 320 may ignore the DiffServ field. Network 320 may use only some of the DiffServ classifications to determine how it will treat incoming packets from computer system 301. Network 320 may override the DiffServ field on incoming packets from computer system 301. Typically, router 321 would be responsible for ignoring or overriding all or part the DiffServ field in packets received from computer 301. However, routers 322 and 323 may also ignore or override the DiffServ field on packets passing through network 320.

The Diffserv field, and the DSCP field in particular, may be used by network 320 to make per-hop behavior (PHB) decisions about further classification, and traffic conditioning functions. Traffic conditioning functions include metering, marking, shaping, or policing. Thus, incoming packets from computer 301 or computer 302 may be subject to differential treatment by routers 321-323 as they are sent through network 320.

Network 320 may implement a common set of differential treatment policies amongst routers 321-323. Thus, network 320 may constitute a DiffServ domain.

Traffic entering or traversing network 320 may be subject to classification and conditioning by one or more of routers 321-323. For example, a router 321 may override the DSCP field in traffic received from computer 301 based on source address, destination address, traffic type, or some other packet field.

Computer system 301 operates to select an optimized value for all or part of a DiffServ field that may be used to send packets through network 320. Computer system 301 may operate to select a value for the DSCP field in an internet protocol packet to optimize some aspect of communication to or through network 320.

To select a value for a DiffServ field, computer system 301 sets the DiffServ field in a block of packets to a first value. Computer system 301 then sends this block of packets to computer system 302 via network 320 at a first throughput (e.g., KB/s) rate. Computer system 301 then sends this block of packets to computer system 302 via network 320 at successively increasing throughput rates.

Computer system 302 sends reports on the received blocks of packets back to computer system 301. For example, computer system 302 may report the received throughput rate of the blocks of packets. In another example, computer system 302 may report an indication of whether, or how many, packets were lost.

These reports may be processed by either computer 301 or computer 302 to determine if the reception of these blocks of packets satisfies one or more criteria. For example, computer 301 may process a report from computer 302 to determine if more than a specified percent (e.g., 1% or 10%) of a block of packets sent at a particular throughput rate and DiffServ field value were lost.

Computer system 301 may then generate a new blocks of packets with different (e.g., second, third, etc.) DiffServ field values. In an embodiment, computer system 301 successively generates blocks of packets with different DiffServ precedence levels. In another embodiment, computer system 301 sucessively generates blocks of packets with different drop probabilities. Computer system 301 may then send these blocks of packets to computer system 302 via network 320 at successively increasing throughput rates. Computer system 301 may then receive reports from computer system 302 about the received blocks of packets. Thus, for each DiffServ field value, computer system 301 is able to measure a performance parameter. For example, for a given DiffServ field value, computer system 301 is able to measure the maximum throughput before a threshold amount of packet loss occurs.

The measured performance parameters for each DiffServ field value may be processed by computer system 301 to select a DiffServ field value. For example, if a first DiffServ field value provides better throughput than a second, then the first DiffServ field value may be selected.

In another example, a service level agreement with the operator of network 320 may provide for differing charges depending on the value of the DiffServ field. Thus, if a first DiffServ field value provides approximately the same performance as a second, then the least expensive of the two DiffServ field values may be selected.

Computer system 301 may then use the selected DiffServ field value to send one of more packets to network 320. These packets may be destined for computer system 302, an internal component of network 320, or another system or network external to network 320 such as computer system 303.

Figure 4:
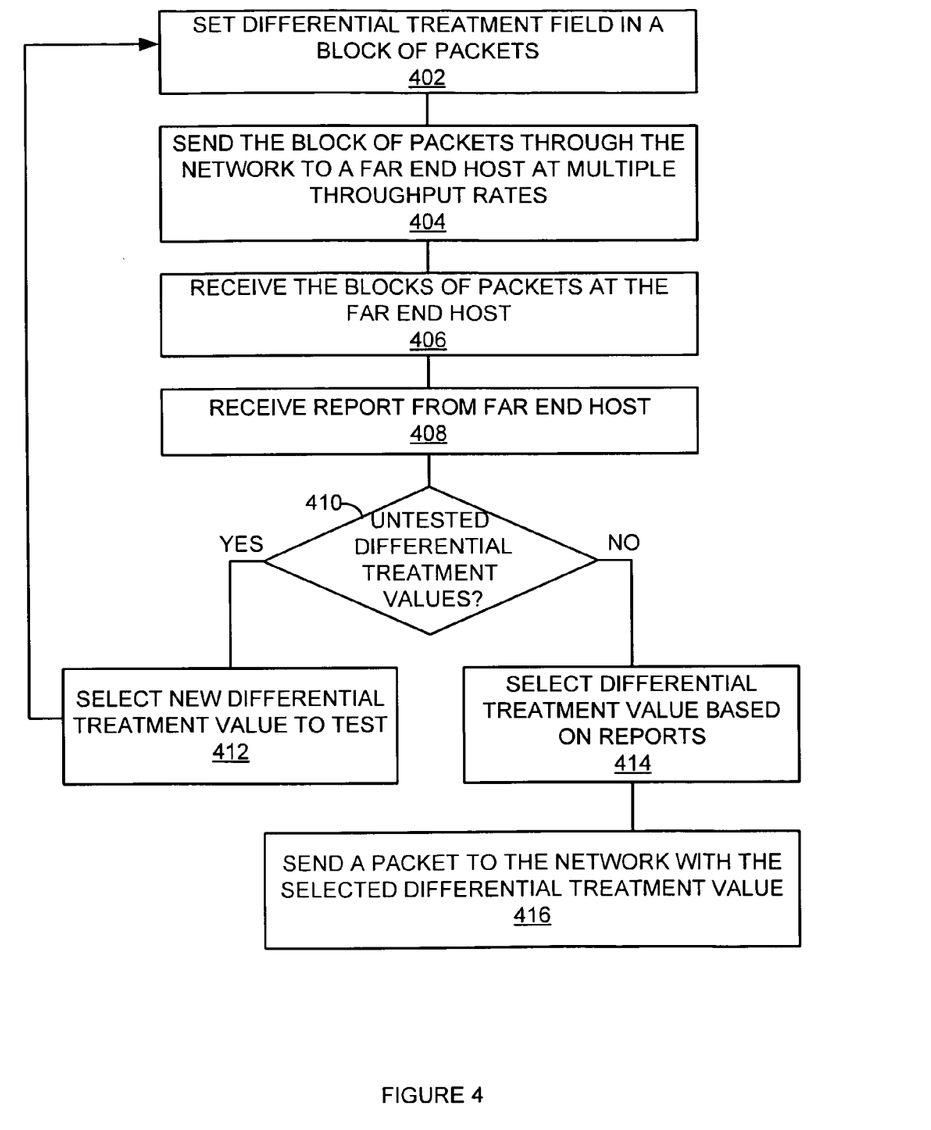
FIG. 4 is a flowchart illustrating a method of optimizing communication.

FIG. 4 is a flowchart illustrating a method of optimizing communication. The method of FIG. 4 may be performed by communication system 100 or communication system 300.

A differential treatment field is set in a block of packets (402). For example, computer system 301 may set the DiffServ field in a block of packets to a first value. In another example, computer system 301 may set the precedence level portion of the DiffServ field in the block of packets to a first value.

The block of packets is sent though the network to a far end host at multiple throughput rates (404). For example, computer system 301 may send a block of packets with a particular DiffServ field value through network 320 to computer 302 at successively increasing throughput rates.

The blocks of packets sent at the multiple throughput rates are received at the far end host (406). For example, computer system 302 may receive blocks of packets sent by computer system 301 at successively higher throughput rates. Computer system 302 may then generate a report with information about the received blocks of packets. This information may include such things as throughput, packet loss, or whether each block of packets satisfied a criteria.

A report from the far end host is received (408). This report may include such information as received throughput, packet loss, or whether each block of packets satisfied a criteria. For example, computer system 301 may receive a report from computer system 302 with information such as throughput, packet loss, or whether each block of packets satisfied a criteria.

If there are more untested differential treatment field values, flow proceeds to block 412. Otherwise, flow proceeds to block 414 (410). If there are untested differential treatment values, a new differential treatment value is selected for testing (412). Flow then proceeds back to block 402. For example, if all of the precedence levels have not been tested, computer system 301 may select a new precedence level for the DiffServ field and then proceed to generate a block of packets with the new DiffServ field value.

A differential treatment field value is selected based on the reports (414). For example, computer system 301 may select a DiffServ field value based on the reports it received from computer system 302 that related each DiffServ field value to a throughput rate and/or packet loss rate.

A packet is sent to the network with the selected differential treatment value (416). For example, computer system 301 may send a packet with the DiffServ value it selected in block 414 to network 320. This packet may be destined for computer system 302, an internal component of network 320, or another system or network external to network 320 such as computer system 303.

The methods, systems, networks, and routers described above may be implemented with, contain, or be executed by one or more computer systems. The methods described above may also be stored on a computer readable medium. Many of the elements of communication network 100 and communication network 300 may be, comprise, or include computers systems. This includes, but is not limited to: communication systems 100 and 300; computer system 101; computer system 102; network 120; computer system 301; computer system 302; computer system 303; network 320; router 321; router 322; and router 323.

Figure 5:
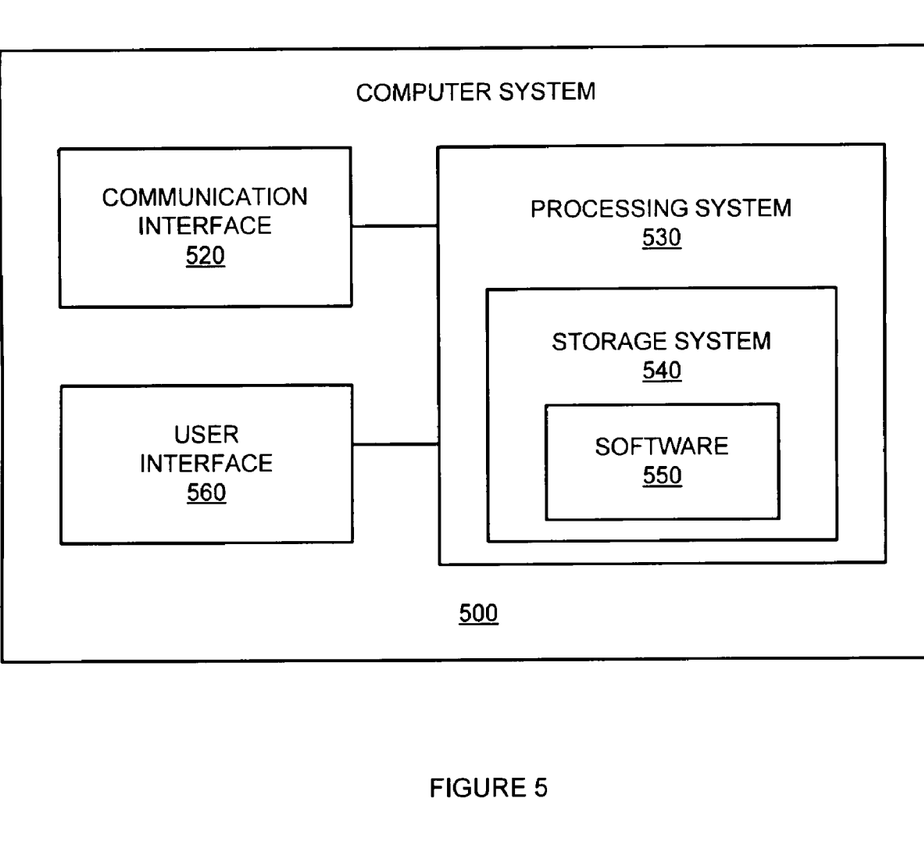
FIG. 5 is a block diagram of a computer.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of optimizing data communication, comprising:
    sending a first block of packets through a network at a first throughput rate, wherein said first block of packets has a differential treatment field set to a first value;
    sending a second block of packets through the network at a second throughput rate, wherein said second block of packets has a differential treatment field set to a second value, wherein the first value is different than the second value, and the first throughput rate is different than the second throughput rate;
    receiving a first report indicating that the reception of the first block of packets satisfies a criteria;
    receiving a second report indicating that the reception of the second block of packets satisfies the criteria;
    selecting a treatment field value for the differential treatment field based on a comparison between the first report and the second report; and,
    sending a packet to the network, wherein the packet has a differential treatment field set to the treatment field value.

2. The method of claim 1, further comprising:
    sending a third block of packets through a network at the second throughput rate, wherein said third block of packets has a differential treatment field set to the first value;
    receiving a third report that the reception of the third block of packets does not satisfy the criteria; and,
    wherein the step of selecting a treatment field value for the differential treatment field is further based on the third report.

3. The method of claim 1, wherein the criteria is based on a value indicative of packet loss.

4. The method of claim 2, wherein the criteria is based on a value indicative of packet loss.

5. The method of claim 1, wherein the differential treatment field comprises an internet protocol differentiated services field.

6. The method of claim 1, wherein the differential treatment field comprises an internet protocol differentiated services code point field.

7. The method of claim 1, wherein the criteria is based on a value indicative of received throughput.

8. A method of optimizing data communication, comprising:
    iteratively sending a first plurality of blocks of packets through a network, wherein the first plurality of blocks of packets have a differential treatment field set to a first value, and wherein the first plurality of blocks of packets are sent through the network at different throughput rates;
    receiving a first plurality of reports corresponding to the first plurality of blocks of packets that indicate whether the reception of each of the first plurality of blocks of packets satisfied a criteria;
    selecting a first throughput rate associated with the first value based on the first plurality of reports;
    iteratively sending a second plurality of blocks of packets through a network, wherein the second plurality of blocks of packets have a differential treatment field set to a second value, and wherein the second plurality of blocks of packets are sent through the network at different throughput rates, wherein the second value is different than the first value;
    receiving a second plurality of reports corresponding to the second plurality of blocks of packets that indicate whether the reception of each of the second plurality of blocks of packets satisfied the criteria;
    selecting a second throughput rate associated with the second value based on the second plurality of reports, wherein the second throughput rate is different than the first throughput rate; and, setting a differential treatment field in a packet to the first value based on a comparison between the first throughput rate and the second throughput rate.

9. The method of claim 8, wherein the criteria is based on a value indicative of packet loss.

10. The method of claim 8, wherein the differential treatment field comprises an internet protocol differentiated services field.

11. The method of claim 8, wherein the differential treatment field comprises an internet protocol differentiated services code point field.

12. The method of claim 8, wherein the criteria is based on a value indicative of received throughput.

13. A communication system, comprising:
a first system coupled to a network;
a second system coupled to the network, wherein a packet sent from the first system to the second system is relayed by at least one router in the network;
and wherein the first system sends a first block of packets through the network to the second system at a first throughput rate, said first block of packets having a differential treatment field set to a first value;
and wherein the first system sends a second block of packets through the network at a second throughput rate, said second block of packets having a differential treatment field set to a second value;
and wherein the first value is different than the second value, and the first throughput rate is different than the second throughput rate;
and wherein the second system generates a first report indicating that the reception of the first block of packets satisfies a criteria;
and wherein the second system generates a second report indicating that the reception of the second block of packets satisfies the criteria;
and wherein the communication system selects a treatment field value for the differential treatment field based on a comparison between the first report and the second report; and,
wherein the first system sends a packet to the network, said packet having a differential treatment field set to the treatment field value.

14. The communication system of claim 13, wherein the first system sends a third block of packets through a network to the second system at the second throughput rate, said third block of packets having a differential treatment field set to the first value;
and wherein the second system generates a third report indicating that the reception of the third block of packets does not satisfy the criteria; and,
wherein the communication system selects the treatment field value for the differential treatment field based on the third report.

15. The communication system of claim 13, wherein the criteria is based on a value indicative of packet loss.

16. The communication system of claim 14, wherein the criteria is based on a value indicative of packet loss.

17. The communication system of claim 13, wherein the differential treatment field comprises an internet protocol differentiated services field.

18. The communication system of claim 13, wherein the differential treatment field comprises an internet protocol differentiated services code point field.

19. The communication system of claim 13, wherein the criteria is based on a value indicative of received throughput.

20. The communication system of claim 13, wherein the criteria is based on a first value indicative of received throughput and a second value indicative of packet loss.

* * * * *